Patented June 10, 1952

2,599,827

UNITED STATES PATENT OFFICE 2,599,827

DEFOLIATION OF GROWING PLANTS

Theodore R. Hansberry, Modesto, Calif., assignor to Shell Development Company, San Francisco, Calif., a corporation of Delaware No Drawing. Application May 1, 1950, Serial No. 159,387

8 Claims. (Cl. 71—2.3)

The present invention relates to the defoliation of growing plants.

The importance and desirability of defoliating living plants is well known. Of particular widespread economic importance is the defoliation of cotton, especially since the successful development of the mechanical cotton picker. This latter development has promoted much research and development in the field of artificial defoliation.

Up until the present time it has been the general understanding that artificial cotton defoliants would be effective only in the presence of water. As a result thereof defoliants have been applied heretofore in one or the other of the only two forms, namely, dusts and aqueous compositions. When applied as a dust, water from the atmosphere was relied upon to make the defoliant effective. Thus, in some climates dust is only effective when applied to foliage previously wet by dew. In climates where dew is not prevalent, hygroscopic agents are added to the dust as a means of collecting and utilizing atmospheric moisture. The use of such dust formulations is not very satisfactory due, inter alia, to this dependence upon the presence of atmospheric moisture. Moreover, the results with either the dusts or the aqueous compositions have never been completely satisfactory because of the large quantities of defoliants required and because of the incomplete defoliation resulting even under the most favorable circumstances.

It is an object of the present invention to overcome the above and other difficulties and defects of the prior art, and to provide improved methods of defoliation and novel compositions for use according to and with such methods. It is a further object of this invention to provide methods and compositions for cotton defoliation which will result in more complete defoliation even when using the active defoliants in amounts or dosages which are materially lower than those heretofore deemed and found necessary.

It has now been found that defoliation of cotton is unexpectedly and outstandingly effective when the active defoliant is applied in an oil carrier. Furthermore, the efficacy of the oil compositions is greatly increased if small amounts of emulsifiers are also included in such compositions.

The value and importance of the present invention may be readily illustrated by the fact that although pentachlorophenol has been known for many years to be a cotton defoliant it has never been used widely, if at all, on a commercial scale. When used according to the present invention, however, pentachlorophenol is an extremely successful cotton defoliant, being more effective at much lower dosages than any commercially available defoliant composition.

The active defoliants which may be used according to this invention are, in general, any of the oil-soluble defoliants, but particularly effective are the polyhalophenols such as, for example, 2,4-dichlorophenol, 2,6-dibromophenol, 2-bromo-4,5-dichlorophenol, 2,4,6-trichlorophenol, 2,3,4,6-tetrachlorophenol, 2,4,6 - trichloro-5-bromophenol, 2,3,4,5,6-pentachlorophenol and the like. The last named compound is commonly known merely as pentachlorophenol.

The oil carriers in which the defoliants may be utilized are, for example, any of the normally used horticultural spray oils. For practical reasons these oils will usually be mineral oils, but oils of animal or vegetable origin or synthetic oils are also satisfactory. In general, the oils should be of a relatively bland, non-toxic nature since any composition which would kill the plant outright could not promote the development of the abscission layers which is necessary to successful defoliation. In order to avoid objectionable staining of the cotton fibers, oils with only a fairly light color should be used. Particularly useful oils are the relatively highly paraffinic (unsulfonatable residue greater than about 80 or 85%) such as mineral seal oil, kerosene, refined gas oils and very light lubricating oils, and the like. Various blends of such oils may be used in which may also be included varying amounts of lesser refined oils such as catalytically cracked gas oil fractions, light diesel oils, etc. For example, a blend of from about 60 to 70% of mineral seal oil, 20 to 30% kerosene, and about 10% of a catalytically cracked gas oil fraction is a very suitable carrier for the defoliants. In general, the oils should have a boiling range within the limits of about 300° F. and about 800° F., preferably between about 400° F. and about 700° F., and a maximum viscosity of about 90 S.S.U. at 100° F., but preferably less than about 60 S.S.U. at 100° F.

Because of the relatively low solubility of polyhalophenols in spray oils, particularly in highly paraffinic mineral spray oils, it will generally be advantageous to use a cosolvent for the phenol and the mineral oil. Such materials as isopropyl alcohol, acetone, aromatic solvents and many others are suitable for promoting the solubility of the phenols in the oils.

The amounts of the various compositions which it will be necessary to use will, of course, depend upon the degree of defoliation desired, the degree of maturity of the plants, the particular active defoliating ingredient employed and, to a lesser extent, the particular oil carrier being used. For defoliation, where a maximum degree of leaf-drop is desired, the compositions will normally be applied at from about 3 to about 20 gallons per acre (preferably from about 5 to about 12 gallons per acre) of a composition containing between about 0.1 and about 0.5 pound of the active defoliant per gallon of solution, although, under many circumstances, as little as about 0.01 or as much as about 3 or 4 pounds per gallon may be utilized. A concentration of about 2% by weight of pentachlorophenol dissolved in oil is particularly effective. This 2% solution, equivalent to about 0.16 pounds per gallon in a typical mineral seal oil, gives approximately 1.5 pounds per acre when applied at the rate of 8½ gallons per acre. In general the concentration of the active defoliant in the oil composition and the rate of application of said composition should be adjusted so as to give between about 0.2 and about 7 pounds per acre of the active defoliant. For most applications between about 0.5 and about 4 pounds per acre will be very satisfactory.

As indicated above, the use of emulsifiers in the present oil compositions results in an additional increase in effectiveness of the defoliant, and this is true even though the oil compositions are preferably utilized as single-phase compositions and are not emulsified in water. The type of emulsifier is not particularly critical, since cationic, anionic or non-ionic agents are all effective. There appears to be, however, a slight preference in favor of cationic agents. For example, amines, amides, quaternary ammonium compounds and the like, such as diethyl amino ethylstearyl amide, n-dodecyl dimethyl benzyl ammonium chloride, heptadecyl glyoxalidine, various pyridinium chlorides, etc., are effective, as are oil-soluble petroleum sulfonic acids, sodium mahogany sulfonates, naphthenic acids and their alkali metal salts, long chain alkyl phosphates, long chain alcohol, ether and ester sulfates, polyoxyethylene sorbitol hexalaurate, the oleic ester of ethylene glycol monobutyl ether, the diacetyl tartaric acid ester of a monoglyceride, and many others. The amount of emulsifier to be added will, of course, depend upon the particular emulsifier, oil and defoliant used, but in almost all cases will be but a small fraction of 1% of the total composition, e. g., from about 0.1 to about 0.5 of 1% of the composition.

Many experiments in the way of both laboratory tests and field tests, have been undertaken in the development of this invention. The results of some of these are set forth in the following examples as illustrative of the outstanding results achieved by this invention. It should be understood, however, that these are merely illustrative and should not be considered as limiting the invention or the claims thereto in any manner.

*Example I*

Pentachlorophenol was dissolved in a spray oil base consisting of about 67 weight per cent mineral seal oil and about 26.5 weight per cent of kerosene. The final composition contained about 2 weight per cent of pentachlorophenol. About 4.5 weight per cent of isopropyl alcohol was used as a cosolvent for the phenol and the mineral oil. The above oil composition was sprayed from an airplane upon cotton at the rate of about 8.5 gallons per acre, or about 1.2 pounds of pentachlorophenol per acre. After only two weeks 50% of the leaves had dropped from the cotton plants, merely from the weight of the leaves. A very slight agitation, such as from a light breeze, resulted in 90% leaf drop. Two hours after spraying and again after one week the cotton fibers were inspected and were found to be free of any straining by the defoliant composition.

In contrast to the above results, when pentachlorophenol was applied in water (as the sodium salt) over 6.6 pounds per acre had to be used to give comparable defoliation.

*Example II*

The procedure of Example I was repeated except that the following composition was used:

| | Weight percent |
|---|---|
| Kerosene | 85.45 |
| Catalytically cracked gas oil | 12.03 |
| Pentachlorophenol | 2.24 |
| Petroleum sulfonates | 0.22 |
| Polyglycol esters | 0.06 |

This composition was applied at the rate of 8.5 gallons per acre, or about 1.4 pounds of pentachlorophenol per acre. The results were substantially the same as those noted in Example I.

*Example III*

Two mineral oil solutions containing about 2 wt. per cent of pentachlorophenol were prepared. One of the solutions contained about one-quarter of one per cent of a mixture of petroleum sulfonates and polyglycol esters, whereas the other contained no emulsifier. The two solutions were sprayed by plane on adjacent plots of cotton at the rate of about 5.6 gallons per acre, or about 1 pound of pentachlorophenol per acre. The following results were observed:

| Composition | 8 Days After Application | | 15 Days After Application | |
|---|---|---|---|---|
| | Percent of leaves killed | Percent of leaves dropped | Percent of leaves killed | Percent of leaves dropped |
| Without emulsifiers | 50 | 25 | 50 | 30 |
| With emulsifiers | 85 | 45 | 95 | 70 |

*Example IV*

Additional comparative field tests were made in which the composition of Example II and the better of the two compositions of Example III were applied to cotton by plane at the rates of 10.5 gallons per acre. After 13 days the first composition had killed 80% of the leaves and caused 50% defoliation. The second composition had killed 90% of the leaves and caused 75% defoliation. An untreated check plot showed only 2% of the leaves dead and only 2% defoliation.

In all of the above and related tests it was noted that the compositions of the present invention were markedly superior to other commercially available defoliant compositions in that the penetration to lower leaves on the plants was much better and the defoliation of the relatively young top leaves was more complete. It was also noted that regrowth took place after spraying. Thus, the defoliants were not completely killing the plants, so that subsequent maturing and opening of the cotton bolls were not adversely affected.

I claim as my invention:

1. A method of defoliating cotton plants which includes the step of applying to the leaves of said plants a composition comprising a solution of pentachlorophenol and an oil-soluble emulsifier in a mineral spray oil, said compositions being applied in an amount of between about 0.5 and about 4 pounds of pentachlorophenol per acre.

2. A method of defoliating cotton plants which includes the step of applying to the leaves of said plants a composition comprising a solution of pentachlorophenol and an oil-soluble emulsifier in a mineral spray oil, said composition being applied in an amount of between about 0.2 and about 7 pounds of pentachlorophenol per acre.

3. A method of defoliating cotton plants which includes the step of applying to the leaves of said plants a composition comprising an oil-soluble polychlorophenol and an oil-soluble emulsifier dissolved in a mineral spray oil, said composition being applied in an amount sufficient to cause the leaves to drop from the living plants.

4. A method of defoliating cotton plants which includes the step of applying to the leaves of said plants a composition comprising a solution of pentachlorophenol in a mineral spray oil, said composition being applied in an amount sufficient to cause the leaves to drop from the living plants.

5. A method of defoliating cotton plants which includes the step of applying to the leaves of said plants a composition comprising an oil-soluble polyhalophenol dissolved in a mineral spray oil, said composition being applied in an amount sufficient to cause the leaves to drop from the living plants.

6. A cotton defoliant composition comprising a mineral oil carrier having an unsulfonatable residue greater than about 80%, said carrier having dissolved therein pentachlorophenol, an oil-soluble emulsifier, and a cosolvent for said pentachlorophenol and said carrier.

7. A cotton defoliant composition consisting essentially of more than about 80% by weight of a mineral spray oil having an unsulfonatable residue greater than about 85%, about 2% by weight of pentachlorophenol, less than 1% of an oil-soluble emulsifier, and an amount of a cosolvent sufficient to render said pentachlorophenol readily soluble in said mineral oil.

8. A cotton defoliant composition comprising a mineral oil carrier having an unsulfonatable residue greater than about 80%, said carrier having dissolved therein an oil-soluble polyhalophenol, an oil-soluble emulsifier, and a cosolvent for said polyhalophenol and said carrier.

THEODORE R. HANSBERRY.

REFERENCES CITED

The following references are of record in the file of this patent:

UNITED STATES PATENTS

| Number | Name | Date |
|---|---|---|
| 2,188,734 | Carswell | Jan. 30, 1940 |
| 2,416,259 | Kagy et al. | Feb. 18, 1947 |

OTHER REFERENCES

Science News Letter, August 2, 1947, page 69.
Science, February 20, 1948, pages 196 and 197.